United States Patent
Chou et al.

(10) Patent No.: US 7,903,738 B2
(45) Date of Patent: Mar. 8, 2011

(54) OPTIMAL CORRELATION MATCHING METHOD AND SYSTEM FOR DETERMINING TRACK BEHAVIOR

(75) Inventors: Tse-An Chou, Taichung (TW); Li-Ming Chen, Keelung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 1487 days.

(21) Appl. No.: 11/076,928

(22) Filed: Mar. 11, 2005

(65) Prior Publication Data
US 2005/0259737 A1 Nov. 24, 2005

(30) Foreign Application Priority Data

May 18, 2004 (TW) ................. 93114001 A

(51) Int. Cl.
*H04N 7/12* (2006.01)
*H04N 11/02* (2006.01)
*H04N 11/04* (2006.01)

(52) U.S. Cl. .................................. 375/240.16; 345/166
(58) Field of Classification Search ............. 375/240.16; 345/166
See application file for complete search history.

(56) References Cited

U.S. PATENT DOCUMENTS

| | | | | |
|---|---|---|---|---|
| 5,575,286 | A | * | 11/1996 | Weng et al. .................. 600/444 |
| 5,703,650 | A | * | 12/1997 | Robinson .................. 348/413.1 |
| 5,812,199 | A | * | 9/1998 | Lu et al. .................... 375/240.16 |
| 6,281,882 | B1 | * | 8/2001 | Gordon et al. ............... 345/166 |
| 6,363,117 | B1 | * | 3/2002 | Kok ......................... 375/240.24 |
| 6,842,483 | B1 | * | 1/2005 | Au et al. ................... 375/240.16 |
| 6,925,123 | B2 | * | 8/2005 | Subramaniyan et al. 375/240.16 |
| 6,947,603 | B2 | * | 9/2005 | Kim .............................. 382/236 |

FOREIGN PATENT DOCUMENTS

GB    2308774 A  *  7/1997

* cited by examiner

*Primary Examiner* — David Czekaj
*Assistant Examiner* — Jeremaiah C Hallenbeck-Huber
(74) *Attorney, Agent, or Firm* — Bacon & Thomas, PLLC

(57) ABSTRACT

An optimal correlation matching method for determining track behavior, which applies a video stream having a first image and a second image for locating a motion vector associated with a block of the first image in the second image, wherein each image has a plurality of blocks in rows and columns and each block has a plurality of pixels in rows and columns. The method divides a search window into a plurality of search subdivisions, selects one from the subdivisions as an operating search window, locates a center of a block respectively at all positions of the operating search window such that upon each position of the center located, pixels of the block of the first image in accordance with the operating search window are applied to corresponding pixels of the second image for performing match operation, thereby reducing required number for match operation.

14 Claims, 6 Drawing Sheets

OPTIMAL CORRELATION MATCHING METHOD AND SYSTEM FOR DETERMINING TRACK BEHAVIOR

BACKGROUND OF THE INVENTION

1. Field of the Invention

The invention relates to an optimal correlation matching method and system for determining track behavior and, more particularly, to an optimal correlation matching method and system for determining track behavior on an optical mouse.

2. Description of Related Art

A typical optical mouse has an image sensor. The image sensor consists of a plurality of image sensing elements. Two sequential images sensed by the image sensor are applied for detecting a motion distance of the mouse. Typically, the detection uses a portion of the first image as a search block, thereby computing a correlation of the search block and a block that has same-size but different-location on the second image. Accordingly, a smallest absolute value is found as the motion distance.

FIG. 1 shows an example of images in which a motion of an optical mouse is detecting. In FIG. 1, a first image 130 and a second image 110 respectively have a size of 16×16 pixels, and a search block 120 has a size of 8×8 pixels, i.e., an 8×8 image on the center of the first image 130. The center of the 8×8 image is denoted by a cross 'X'. As shown in FIG. 1, after being extracted, the search block is moved to different directions for computing the correlation with the second image 110. Since motion distance of an optical mouse is associated with the motion speed of the optical mouse operated by a user. The first image 130 is typically no more than 4 pixels different from the second image 110. Thus, when computing the correlation between the search block 120 and the second image 110, the center of the search block 120 is respectively located at each circle, as denoted by an 'O', of the second image 110 and accordingly the correlation between the search block 120 and the second image 110 is computed. Thus, in this case, eighty-one values C1-C81 are produced to represent the correlation between the search block 120 and the second image 110. Upon the eighty-one values C1-C81, a respective displacement point having the optimal correlation can be found to determine the motion distance.

However, such a process requires a large amount of computation. For example, as cited, the search block 120 is moved eighty-one times for computing the respective correlation to accordingly find the displacement point. Therefore, it is desirable to provide an improved method to mitigate and/or obviate the aforementioned problems.

SUMMARY OF THE INVENTION

The object of the invention is to provide an optimal correlation matching method and system for determining track behavior, which can reduce required number for match operation.

According to a feature of the invention, an optimal correlation matching method for determining track behavior is provided. The method applies a video stream having a 0-th image, a first image and a second image for locating a motion vector associated with a block of the first image in the second image, wherein each image has a plurality of blocks in rows and columns and each block has a plurality of pixels in rows and columns. The method includes a search window determining step, a search window dividing step, a subdivision selecting step, a first correlation match computing step, a first motion vector finding step, a displacement estimating step, a second correlation match computing step, and a second motion vector finding step. The search window determining step determines a location and size of a search window of the second image. The search window dividing step divides the search window into a plurality of search subdivisions. The subdivision selecting step selects one from the subdivisions as an operating search window. The first correlation match computing step locates a center of the block of the first image respectively at each position of the operating search window such that upon each position of the center located, pixels of the block of the first image in accordance with the operating search window are applied to corresponding pixels of the second image for performing match operation to thus produce a first set of measure results. The first motion vector finding step selects a respective position that has the smallest value among the first set of measure results and accordingly computes a vector of the respective position and the center of the block of the first image as the motion vector of the block. The displacement estimating step estimates an estimated motion vector of the block present between the first and the second images according to a predetermined motion vector of the block present between the 0-th and the first images, thereby obtaining an estimated center of the estimated motion vector. The second correlation match computing step applies pixels of the block in accordance with surrounding positions of the estimated center of the estimated motion vector to corresponding pixels of the second image for performing match operation, thereby producing a second set of measure results. The second motion vector finding step selects a final position that has the smallest value among all measure results in the first and the second sets and accordingly computes a vector of the final position and the center of the block of the first image as the motion vector of the block.

According to another feature of the invention, an optimal correlation matching system for determining track behavior is provided. The system applies a video stream having a 0-th image, a first image and a second image for locating a motion vector associated with a block of the first image in the second image, wherein each image has a plurality of blocks in rows and columns and each block has a plurality of pixels in rows and columns. The system includes a light source, a pixel array, an analogue to digital converter (ADC) and a controller. The light source illuminates a sampling plane. The pixel array consists of a plurality of sensing elements to capture the images from the sampling plane, thereby forming the video stream. The ADC is coupled to the pixel array for converting the video stream into digital signals. The controller is coupled between the light source and the ADC for controlling their timing such that the controller determines a location and size of a search window of the second image, divides the search window into a plurality of search subdivisions, selects one from the subdivisions as an operated search window, locates a center of the block of the first image respectively at each position of the operated search window so that upon each position of the center located, pixels of the block of the first image in accordance with the operated search window are applied to corresponding pixels of the second image for performing match operation to thus produce a first set of measure results, selects a respective position that has the smallest value among the first set of measure results and accordingly computes a vector of the respective position and the center of the block of the first image as the motion vector of the block, estimates an estimated motion vector of the block present between the first and the second images according to a predetermined motion vector of the block present between the 0-th and the first images, thereby obtaining an estimated center of the estimated motion vector, applies pixels of the block in accordance with surrounding positions of the estimated center of the estimated motion vector to corresponding pixels of the second image for performing match operation, thereby producing a second set of measure results, and selects a final position that has the smallest value among all measure results in the first and the second sets and accordingly computes a vector of the final position and the center of the block of the first image as the motion vector of the block.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
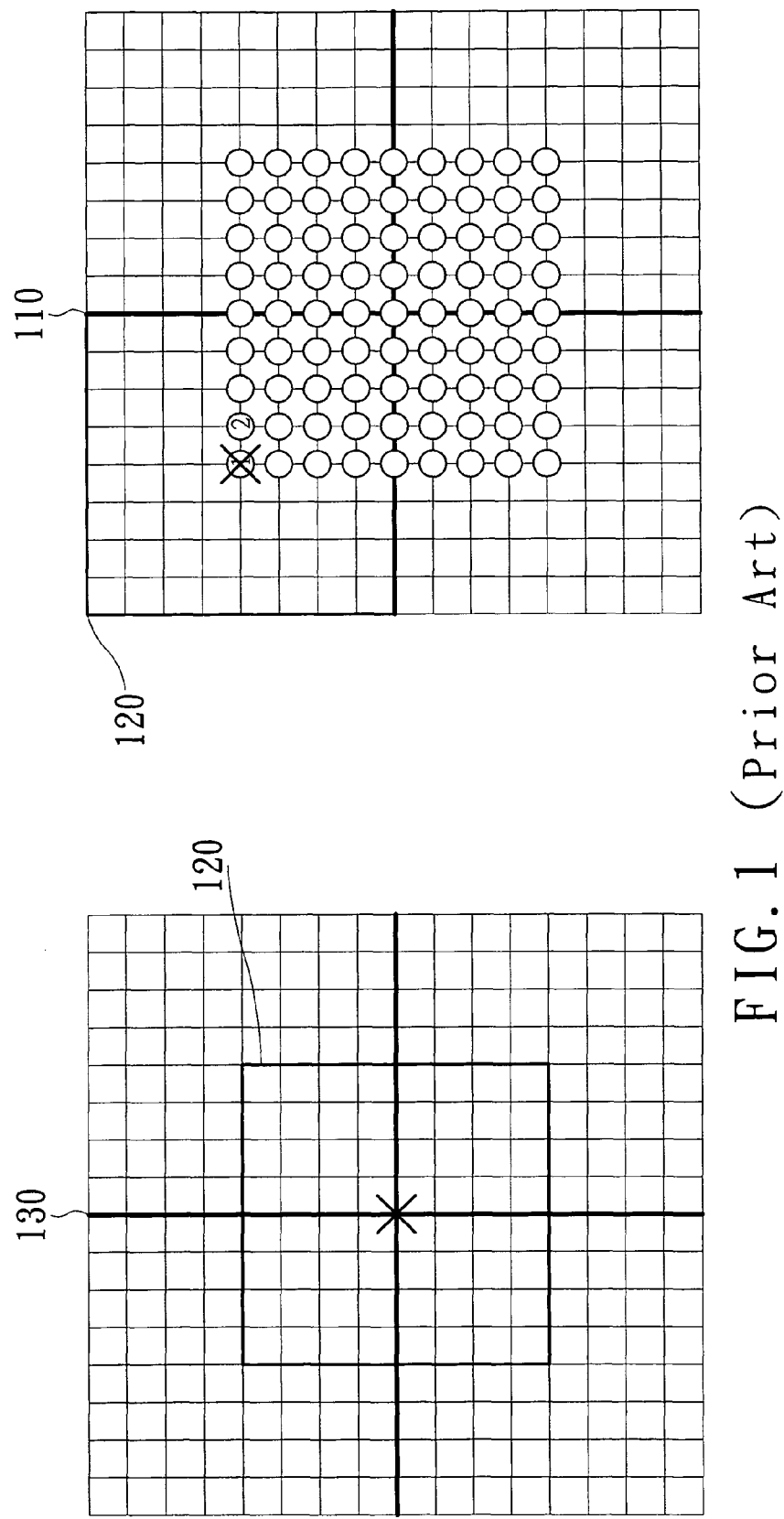
FIG. 1 is a schematic diagram of a typical correlation computation.
Figure 2:
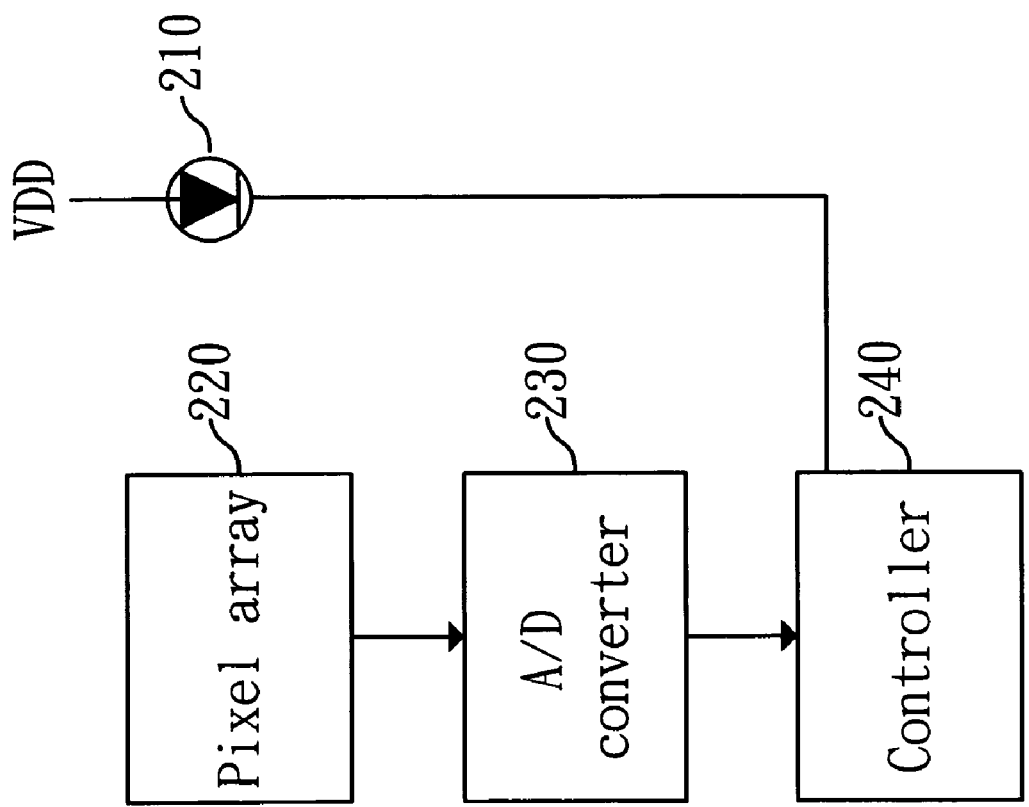
FIG. 2 is a schematic diagram of an optimal correlation matching system for determining track behavior according to the invention.

FIG. 2 is a schematic diagram of an optimal correlation matching system for determining track behavior according to the invention, which applies a video stream with three images for locating a motion vector associated with a block of a first image in a second image, wherein each image has a plurality of blocks in rows and columns and each block has a plurality of pixels in rows and columns. The system includes a light source 210, a pixel array 220, an analog to digital converter (ADC) 230 and a controller 240.

The light source 210 illuminates a sampling plane. Preferably, the light source 210 is a light-emitting diode (LED). The pixel array 220 consists of a plurality of sensing elements to capture the images from the sampling plane, thereby forming the video stream. The ADC 230 is coupled to the pixel array 220 for converting the video stream into digital signals. The controller 240 is coupled between the light source 210 and the ADC 230 for controlling their timing respectively for illumination and conversion.

Figure 3:
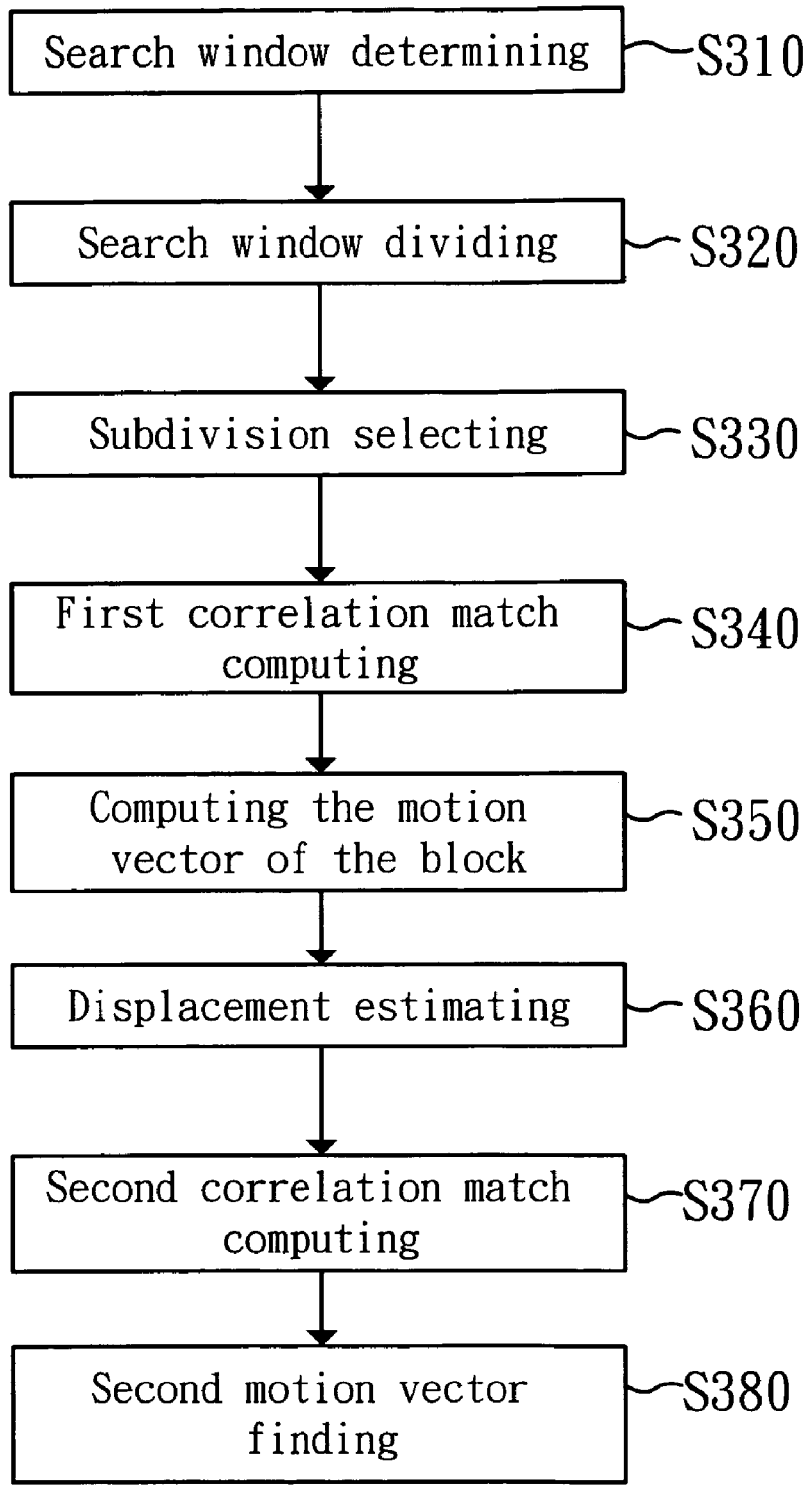
FIG. 3 is a schematic diagram of an optimal correlation matching method for determining track behavior according to the invention.
Figure 4:
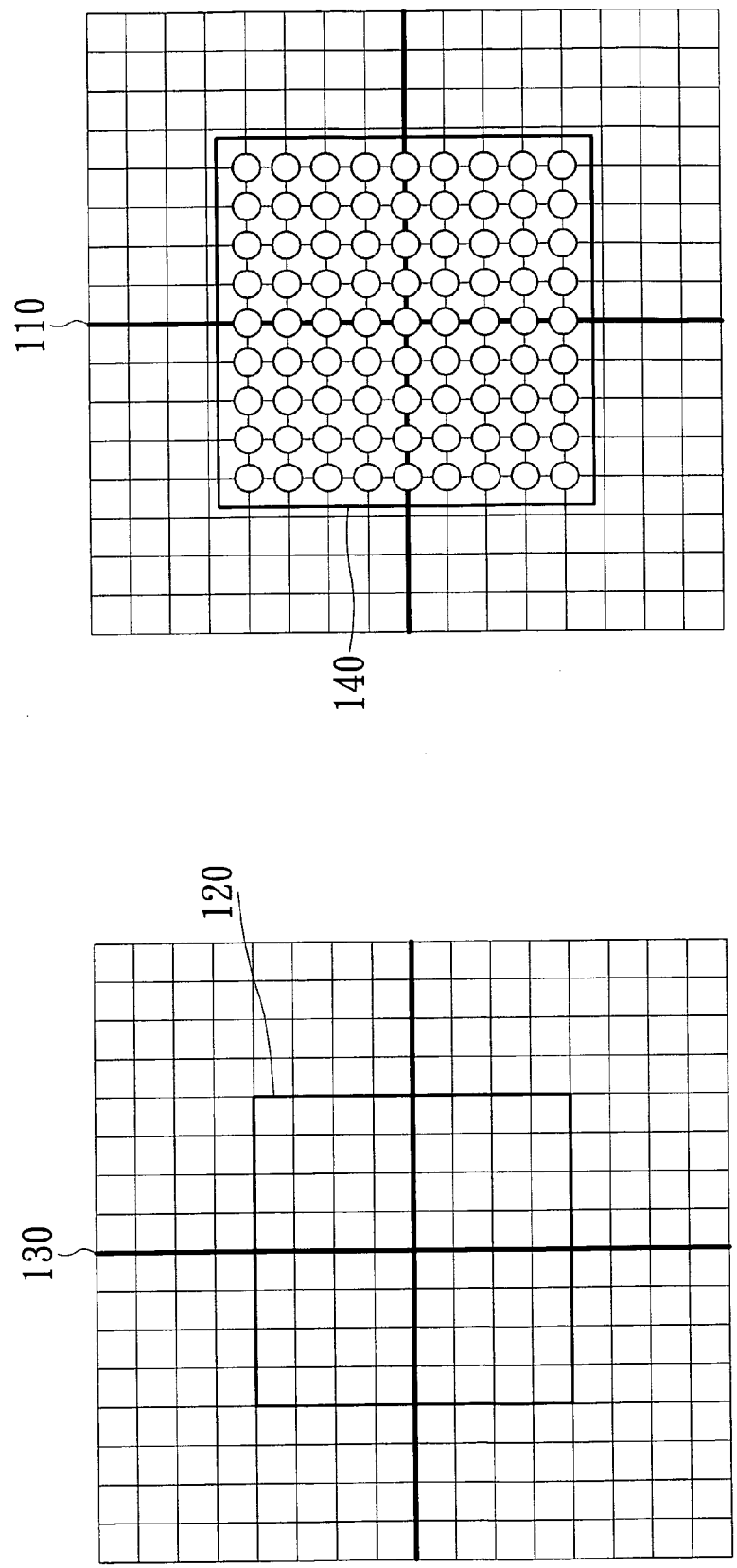
FIG. 4 is a schematic diagram of determining a search window according to the invention.

FIG. 3 is a schematic diagram of an optimal correlation matching method for determining track behavior according to the invention. FIG. 4 is a schematic diagram of determining a search window according to the invention. As to an example of providing a video stream with a first image 130 and a second image 110 as shown in FIG. 4, the method of FIG. 3 locates a motion vector associated with a block 120 of the first image 130 in the second image 110. In this embodiment, the block 120 has a size of 8×8 pixels centered on the center of the first image 130. The first image 130 and the second image 110 respectively have a plurality of blocks in rows and columns, each block having a plurality of pixels in rows and columns.

As shown in FIG. 3, a search window determining process is executed in step S310, which determines a location and size of a search window 140 of the second image 110 according to a first regulation. According to the high resolution of computer screens, an optical mouse applied to the computer screens requires high motion speed. Accordingly, the first regulation is based on the motion speed of the optical mouse to adjust the size of the search window 140. In this embodiment, the size of the search window 140 has a range of ±4 pixels located on the center of the second image 110 and indicated by a circle (O).

Figure 5:
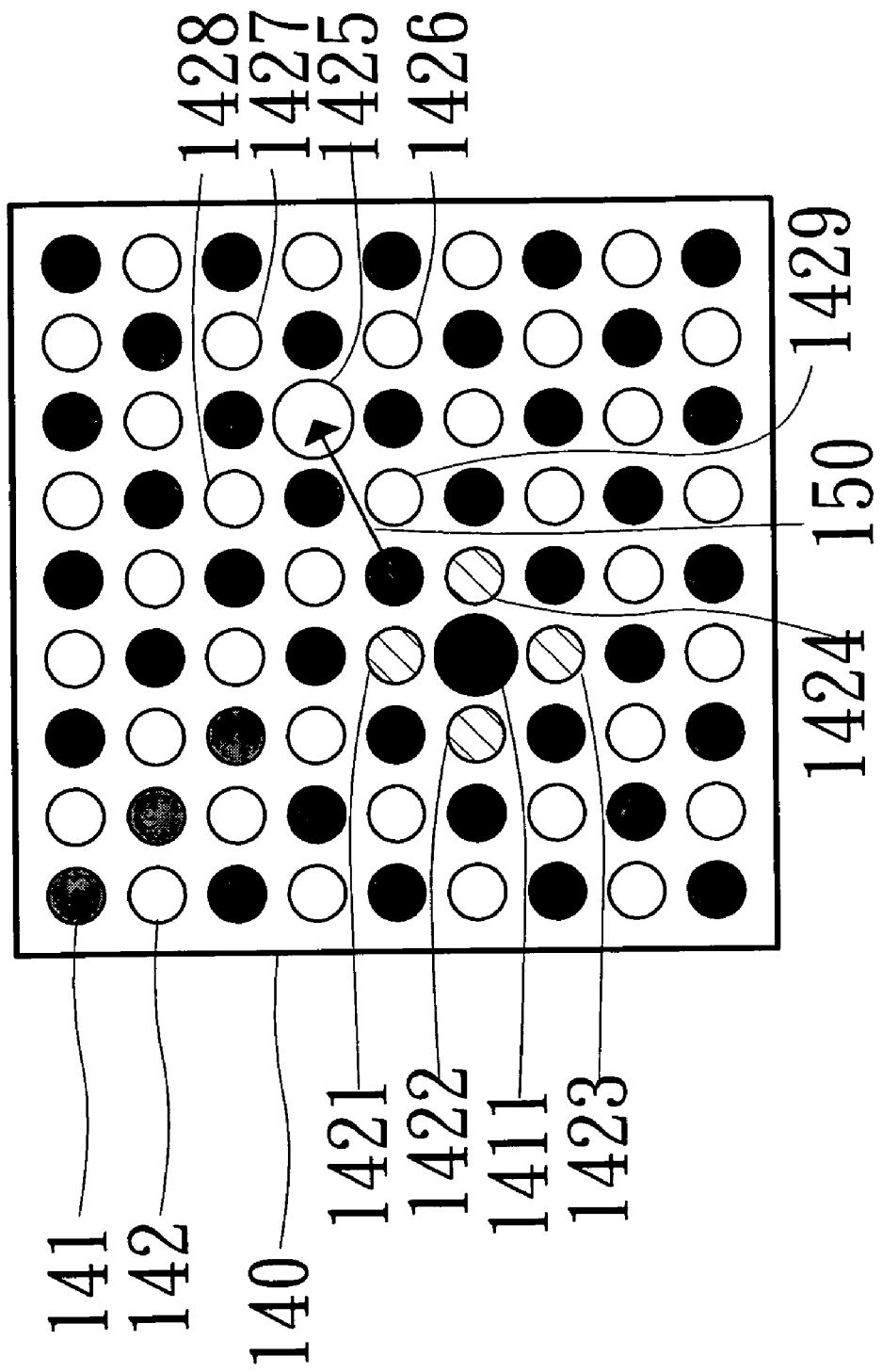
FIG. 5 is a schematic diagram of finding a motion vector according to the invention.

A search window dividing process is executed in step S320, which divides the search window 140 into a plurality of subdivisions. As shown in FIG. 5, the search window 140 is divided into two mutually exclusive search subdivisions, where a first search subdivision 141 is made up of odd pixels of the search window 140, indicted by solid circles, and a second search subdivision 142 is made up of even pixels of the search window 140, indicated by hollow circles.

A subdivision selecting process is executed in step S330, which selects one from the subdivisions as an operating search window. For illustrative purpose, the first subdivision 141 is selected as the operating search window. Namely, the center of the block 120 is located respectively at each position (solid circle) of the first subdivision 141 such that upon each position of the center located, pixels of the block 120 in accordance with the operating search window are applied to corresponding pixels of the second image 110 for performing match operation.

A first correlation match computing process is executed in step S340, which locates the center of the block 120 respectively at each position of the operating search window (in this case, the first subdivision 141) such that upon each position of the center located, pixels of the block 120 in accordance with the operating search window are applied to corresponding pixels of the second image for performing match operation to thus produce a set of measure results. The match operation can be a mean square error represented by the following equation:

$$MSE = \frac{1}{N^2}\sum_{i=0}^{N-1}\sum_{j=0}^{N-1}(Cij - Rij)^2,$$

where N indicates row number in the i-th block 120, Cij indicates a pixel value of i-th row and j-th column of the block 120, and Rij indicates a pixel value of the second image 110 corresponding to the i-th row and j-th column of the block 120. The match operation can be a mean absolute error represented by the following equation:

$$MAE = \frac{1}{N^2}\sum_{i=0}^{N-1}\sum_{j=0}^{N-1}|Cij - Rij|,$$

where N indicates row number in the i-th block 120, Cij indicates a pixel value of i-th row and j-th column of the block 120, and Rij indicates a pixel value of the second image 110 corresponding to the i-th row and j-th column of the block 120. The match operation can be a sum absolute error represented by the following equation:

$$SAE = \sum_{i=0}^{N-1}\sum_{j=0}^{N-1}|Cij - Rij|,$$

where N indicates row number in the i-th block 120, Cij indicates a pixel value of i-th row and j-th column of the block 120, and Rij indicates a pixel value of the second image 110 corresponding to the i-th row and j-th column of the block 120. Accordingly, because the first subdivision 141 has forty-one positions, the first set of measure results has 41 values.

In step S350, upon the measure results, a position 1411 having the smallest value is selected from the first subdivision 141, which indicates a closest position in the second image 110 to the block 120. However, only the positions of the first subdivision 141 are applied to corresponding pixels of the second image 110 for performing match operation, without positions of the second subdivision 142. At this point, the position 1411 can only be regarded as a local minimum position. Upon statistics and experientialism, a global minimum position is around the local minimum position. Accordingly, pixels of the block 120 in accordance with positions 1421, 1422, 1423, 1424 of the second subdivision 142 are applied to corresponding pixels of the second image 110 for performing match operation firstly and then one of the positions 1421, 1422, 1423, 1424 that has the smallest measure result is selected as the motion vector of the block.

Figure 6:
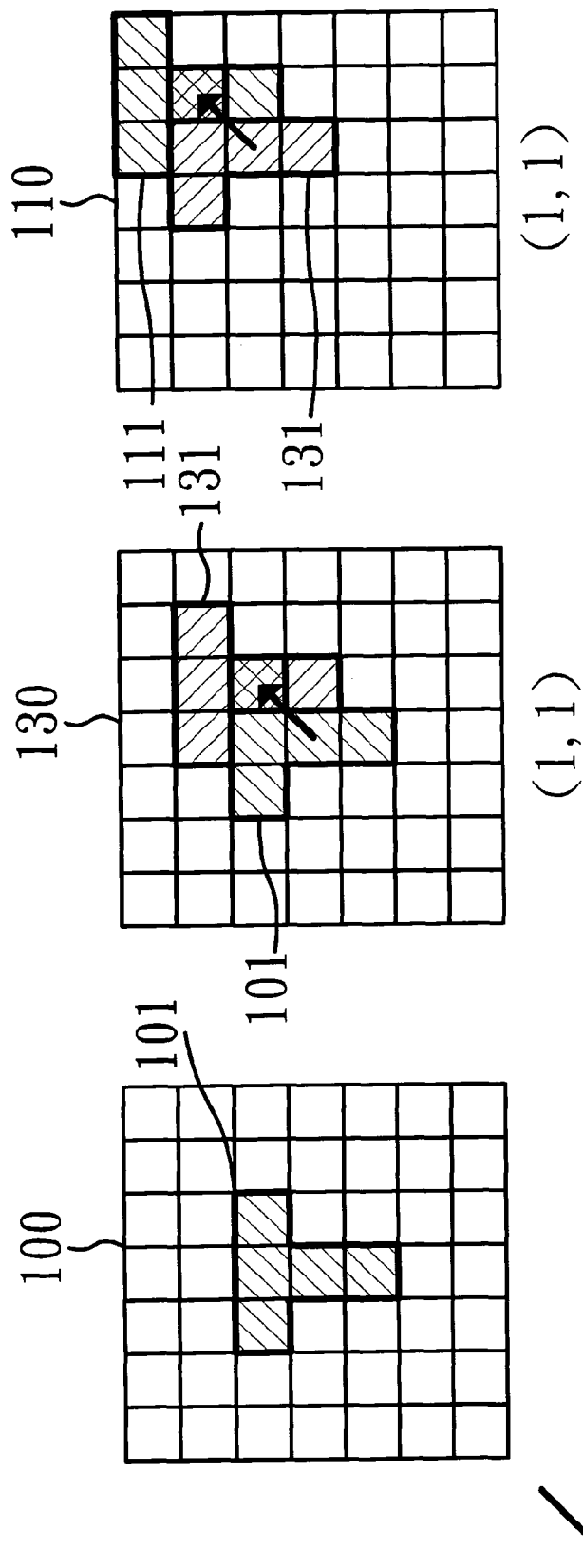
FIG. 6 is a schematic diagram of motion vector correlation according to the invention.

Since the optical mouse moves consecutively, as shown in FIG. 6, when the optical mouse moves to the lower left corner, a T-shape figure moves to the upper right corner in successive images (the 0-th image 100, the first image 130 and the second image 110) captured by the optical mouse. It can be seen that the motion vector between the T-shape FIG. 111 of the second image 110 and the T-shape FIG. 131 of the first image 130 is (1,1), and the motion vector between the T-shape FIG. 131 of the first image 130 and the T-shape FIG. 101 of the 0-th image 100 is also (1,1). Therefore, a displacement estimating process is executed in step S360, which estimates a motion vector of the block. In this case, an estimated motion vector 150 directs to a position 1425 in FIG. 5.

A second correlation match computing process is executed in step S370, in which pixels of the block 120 in accordance with both the estimated motion vector 150 and positions 1426 (lower right), 1427 (upper right), 1428 (upper left), 1429 (lower left) of the second subdivision that are around the position 1425 are applied to corresponding pixels of the second image 110 for performing match operation to thus produce a second set of measure results.

A second motion vector finding process is executed in step S380, which selects a final position that has the smallest value among all measure results in the first and the second sets, and accordingly computes a vector of the final position and the center of the block 120 as the motion vector of the block 120 in the second image.

As cited, after the invention performs 41+4+5=50 times at match operation, other than the prior art that requires performing 81 times, the motion vector associated with the block 120 of the first image 130 can be found in the second image 110.

Although the present invention has been explained in relation to its preferred embodiment, it is to be understood that many other possible modifications and variations can be made without departing from the spirit and scope of the invention as hereinafter claimed.

What is claimed is:

1. An optimal correlation matching method implemented in an optical mouse for determining track behavior, which applies a video stream having a 0-th image, a first image and a second image for locating a motion vector associated with a block of the first image in the second image, wherein the images are captured from a sampling plane by a pixel array, each image has a plurality of blocks in rows and columns and each block has a plurality of pixels in rows and columns, the method comprising the steps:

a search window determining step, which determines a location and size of a search window of the second image;

a search window dividing step, which divides the search window into two mutually exclusive search subdivisions, one of the two search subdivisions consisting of odd pixels of the search window and the other of the two subdivisions consisting of even pixels of the search window;

a subdivision selecting step, which selects one from the two search subdivisions as an operating search window;

a first correlation match computing step, which locates a center of the block respectively at each position of the operating search window such that upon each position of the center located, pixels of the block of the first image in accordance with the operating search window are applied to corresponding pixels of the second image for performing match operation to thus produce a first set of measure results;

a first motion vector finding step, which selects a respective position that has the smallest value among the first set of measure results and accordingly computes a vector of the respective position and the center of the block of the first image as the motion vector of the block;

a displacement estimating step, which estimates an estimated motion vector of the block present between the first and the second images according to a predetermined motion vector of the block present between the 0-th and the first images, thereby obtaining an estimated center of the estimated motion vector;

a second correlation match computing step, which applies pixels of the block in accordance with upper left, upper right, lower left and lower right positions of the estimated center of the estimated motion vector to corresponding pixels of the second image for performing match operation, thereby producing a second set of measure results; and a second motion vector finding step, which selects a final position that has the smallest value among all measure results in the first and the second sets and accordingly computes a vector of the final position and the center of the block of the first image as the motion vector of the block.

2. The method as claimed in claim 1, wherein the first motion vector finding step further comprises a step of applying pixels of the block in accordance with up, down, left and right positions of the respective position selected to corresponding pixels of the second image for further performing match operation, and accordingly selecting a new respective position, which has the smallest value among measure results generated after the match operation is further performed, as the motion vector of the block.

3. The method as claimed in claim 1, wherein the center of the block is located at a center of the first image.

4. The method as claimed in claim 3, wherein a center of the search window is located at the center of the block.

5. The method as claimed in claim 1, wherein the match operation is a mean square error (MSE).

6. The method as claimed in claim 1, wherein the match operation is a mean absolute error (MAE).

7. The method as claimed in claim 1, wherein the match operation is a sum absolute error (SAE).

8. An optimal correlation matching system for determining track behavior, which applies a video stream having a 0-th image, a first image and a second image for locating a motion vector associated with a block of the first image in the second image, wherein each image has a plurality of blocks in rows and columns and each block has a plurality of pixels in rows and columns, the system comprising:

a light source, which illuminates a sampling plane;

a pixel array, which consists of a plurality of sensing elements to capture the images from the sampling plane, thereby forming the video stream;

an analog to digital converter (ADC), which is coupled to the pixel array for converting the video stream into digital signals; and a controller, which is coupled between the light source and the ADC for controlling their timing such that the controller determines a location and size of a search window of the second image, divides the search window into two mutually exclusive search subdivisions, one of the two search subdivisions consisting of odd pixels of the search window and the other of the two subdivisions consisting of even pixels of the search window, selects one from the two search subdivisions as an operating search window, locates a center of the block respectively at each position of the operating search window so that upon each position of the center located, pixels of the block in accordance with the operating search window are applied to corresponding pixels of the second image for performing match operation to thus produce a first set of measure results, selects a respective position that has the smallest value among the first set of measure results and accordingly computes a vector of the respective position and the center of the block of the first image as the motion vector of the block, estimates an estimated motion vector of the block present between the first and the second images according to a predetermined motion vector of the block present between the 0-th and the first images, thereby obtaining an estimated center of the estimated motion vector, applies pixels of the block in accordance with upper left, upper right, lower left and lower right positions of the estimated center of the estimated motion vector to corresponding pixels of the second image for performing match operation, thereby producing a second set of measure results, and selects a final position that has the smallest value among all measure results in the first and the second sets and accordingly computes a vector of the final position and the center of the block of the first image as the motion vector of the block.

9. The system as claimed in claim 8, wherein the center of the block is located at a center of the first image.

10. The system as claimed in claim 9, wherein a center of the search window is located at the center of the block.

11. The system as claimed in claim 8, wherein the match operation is a mean square error (MSE).

12. The system as claimed in claim 8, wherein the match operation is a mean absolute error (MAE).

13. The system as claimed in claim 8, wherein the match operation is a sum absolute error (SAE).

14. The system as claimed in claim 8, wherein the light source is a light emitting diode (LED).

* * * * *